(12) United States Patent
Jones et al.

(10) Patent No.: US 8,972,681 B2
(45) Date of Patent: *Mar. 3, 2015

(54) ENHANCED COPY-ON-WRITE OPERATION FOR SOLID STATE DRIVES

(71) Applicant: International Business Machines Corporation, Armonk, NY (US)

(72) Inventors: Carl Evan Jones, Tucson, AZ (US); Subhojit Roy, Pune (IN); Rahul Fiske, Pune (IN)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/842,292

(22) Filed: Mar. 15, 2013

(65) Prior Publication Data

US 2013/0238869 A1  Sep. 12, 2013

Related U.S. Application Data

(63) Continuation of application No. 13/205,493, filed on Aug. 8, 2011, now Pat. No. 8,868,869.

(51) Int. Cl.
*G06F 12/00* (2006.01)
*G06F 3/06* (2006.01)
(Continued)

(52) U.S. Cl.
CPC ............ *G06F 3/065* (2013.01); *G06F 12/0246* (2013.01); *G06F 12/02* (2013.01); *G06F 11/1446* (2013.01)
USPC ........... 711/165; 711/103; 711/114; 711/162; 707/639

(58) Field of Classification Search
CPC ..... G06F 11/1446; G06F 12/02; G06F 3/065; G06F 12/0246
USPC .................... 711/103, 114, 162, 165; 707/639
See application file for complete search history.

(56) References Cited

U.S. PATENT DOCUMENTS 5,459,850 A    10/1995  Clay et al.
7,328,226 B1 *  2/2008  Karr et al. ............................ 1/1
(Continued)

OTHER PUBLICATIONS

UK Combined Search and Examination Report under Sections 17 and 18(3), Application No. GB1213942.4, Nov. 27, 2012.
(Continued)

*Primary Examiner* — Tuan Thai
*Assistant Examiner* — Mark Giardino, Jr.
(74) *Attorney, Agent, or Firm* — Nelson and Nelson; Daniel P. Nelson; Alexis V. Nelson

(57) ABSTRACT

A method for increasing the efficiency of a "copy-on-write" operation performed on an SSD to extend the life of the SSD is disclosed herein. In one embodiment, such a method includes receiving a first logical address specifying a logical location where new data should be written to an SSD. The first logical address maps to a first physical location, storing original data, on the SSD. The method further receives a second logical address specifying a logical location where the original data should be available on the SSD. The second logical address maps to a second physical location on the SSD. To efficiently perform the copy-on-write operation, the method writes the new data to a new physical location on the SSD, maps the first logical address to the new physical location, and maps the second logical address to the first physical location. A corresponding apparatus is also disclosed.

13 Claims, 9 Drawing Sheets

(51) Int. Cl.
  *G06F 12/02* (2006.01)
  *G06F 13/00* (2006.01)
  *G06F 13/28* (2006.01)
  *G06F 11/14* (2006.01)

(56) References Cited

U.S. PATENT DOCUMENTS

| | | | |
|---|---|---|---|
| 7,730,222 B2 * | 6/2010 | Passerini | 710/5 |
| 2003/0225961 A1 * | 12/2003 | Chow et al. | 711/103 |
| 2004/0221125 A1 | 11/2004 | Ananthanarayanan et al. | |
| 2008/0313505 A1 | 12/2008 | Lee et al. | |
| 2009/0249119 A1 * | 10/2009 | Sethumadhavan et al. | 714/15 |
| 2009/0271563 A1 | 10/2009 | Gopalan et al. | |
| 2009/0300277 A1 | 12/2009 | Jeddeloh | |
| 2010/0153620 A1 | 6/2010 | McKean et al. | |
| 2010/0235831 A1 | 9/2010 | Dittmer | |
| 2011/0010488 A1 | 1/2011 | Aszmann et al. | |
| 2011/0161298 A1 * | 6/2011 | Grobman et al. | 707/649 |
| 2011/0286123 A1 | 11/2011 | Montgomery | |

OTHER PUBLICATIONS

Reply to UK Combined Search and Examination Report under Sections 17 and 18(3), Application No. GB1213942.4, Apr. 1, 2013.

Jo, Heeseung, et al., "SSD-HDD-Hybrid Virtual Disk in Consolidated Environments," Proceedings of Virtualization in High-Performance Cloud Computing (VHPC), 2009.

* cited by examiner

ENHANCED COPY-ON-WRITE OPERATION FOR SOLID STATE DRIVES

BACKGROUND

1. Field of the Invention

This invention relates to apparatus and methods for creating and managing point-in-time copies of data, and more specifically to apparatus and methods for efficiently performing "copy-on-write" operations on solid state drives.

2. Background of the Invention

Data snapshot technology is used with increasing prevalence to protect data and perform tasks such as data mining and cloning. Generally speaking, a "snapshot" is a point-in-time copy of data that reflects the state of the data at a specific moment in time. The increasing prevalence of snapshot technology is at least partly due to the benefits that snapshots provide. Among other benefits, snapshots may improve application availability, provide faster recovery, make it easier to manage backups of large volumes of data, reduce exposure to data loss, and reduce or eliminate the need for backup windows.

Currently, various approaches exist for implementing snapshots on storage devices. One approach for implementing a snapshot is to use a "copy-on-write" technique. Using such an approach, when a snapshot of a production volume is created, the snapshot is created instantly and no production data is actually copied from the production volume to the snapshot volume. As writes to blocks of the production volume are received, the original data in the blocks is copied from the production volume to the snapshot volume. This keeps the data in the snapshot consistent with the time the snapshot was created. Read requests to the snapshot volume for data blocks that are still not copied are redirected to the original volume, while read requests to data blocks that have been copied are directed to the snapshot volume. In this way, data is migrated from the production volume to the snapshot volume as writes to the production volume are received.

Unfortunately, the copy-on-write technique has disadvantages alongside the advantages it presents to users. For example, the copy-on-write technique typically requires multiple read/write operations (one read and two writes) for each application write I/O. That is, for each first write request received for a given data block on a production volume, original data must be read from the data block and written to the snapshot volume. Only then may new data associated with the write I/O request be written to the block of the production volume. This process consumes significant memory and bandwidth. The application write latency is also adversely impacted due to the multiple I/Os associated with the write request. This is because the application will only receive a write acknowledgement after all three I/Os are complete.

One additional disadvantage of the copy-on-write technique is manifest with newer high-speed storage media such as solid state drives (SSDs). Such SSDs are becoming more popular as back-end storage devices. However, such devices currently have limitations in terms of the number of write/erase cycles they can handle during their lifetimes. That is, the memory cells of the SSDs can only be overwritten a finite number of times. Since the conventional copy-on-write operation discussed above involves multiple writes to back-end storage devices, the conventional copy-on-write operation undesirably reduces the effective life of SSDs.

In view of the foregoing, what are needed are apparatus and methods to more efficiency perform copy-on-write operations on SSDs. Ideally, such apparatus and methods will extend the effective lives of SSDs that store snapshot volumes.

SUMMARY

The invention has been developed in response to the present state of the art and, in particular, in response to the problems and needs in the art that have not yet been fully solved by currently available apparatus and methods. Accordingly, the invention has been developed to provide apparatus and methods to increase the efficiency of "copy-on-write" operations performed on SSD drives. Such apparatus and methods advantageously increase the lifetime of SSD drives used to implement "copy-on-write" snapshots. The features and advantages of the invention will become more fully apparent from the following description and appended claims, or may be learned by practice of the invention as set forth hereinafter.

Consistent with the foregoing, a method for increasing the efficiency of a "copy-on-write" operation performed on an SSD is disclosed herein. In one embodiment, such a method includes receiving a first logical address specifying a logical location where new data should be written to an SSD. The first logical address maps to a first physical location, storing original data, on the SSD. The method further receives a second logical address specifying a logical location where the original data should be available on the SSD. The second logical address maps to a second physical location on the SSD. To efficiently perform the copy-on-write operation, the method writes the new data to a new physical location (different from the first physical location) on the SSD, maps the first logical address to the new physical location, and maps the second logical address to the first physical location. In this way, the copy-on-write operation is performed without physically moving the original data on the SSD. In many cases, this will eliminate the need to copy (i.e., read and write) the original data. A corresponding apparatus (i.e., an SSD configured to perform the above stated-method) is also disclosed and claimed herein.

In another aspect of the invention, a method for increasing the efficiency of a "copy-on-write" operation performed on an SSD includes receiving, by a storage virtualization layer, a write command. The storage virtualization layer determines whether a copy-on-write operation is required in response to the write command (e.g., by determining whether the write command is the first write to a block of a production volume after creation of a snapshot volume). The storage virtualization layer then sends, in the event the copy-on-write operation is required, a command to a solid state drive (SSD) to perform an enhanced copy-on-write operation. The command has the following arguments: (1) new data to be written to the SSD; (2) a first logical address specifying a logical location where the new data should be written to the SSD; and (3) a second logical address specifying a logical location where the original data should be available on the SSD. If both the production volume and snapshot volume are located on the same SSD, such a command may allow the copy-on-write operation to be performed on the SSD without physically moving the original data on the SSD.

BRIEF DESCRIPTION OF THE DRAWINGS

In order that the advantages of the invention will be readily understood, a more particular description of the invention briefly described above will be rendered by reference to specific embodiments illustrated in the appended drawings.

Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
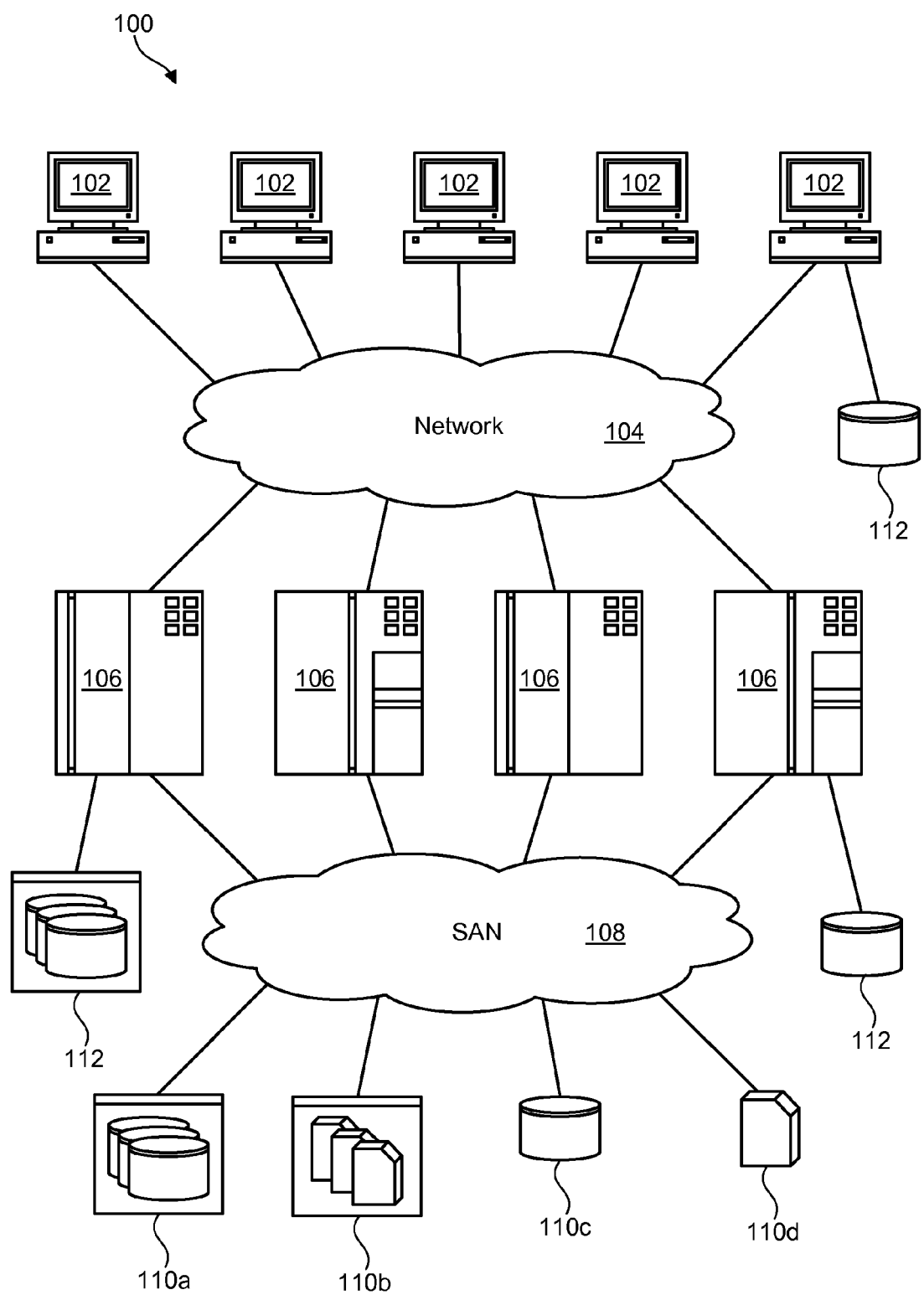
FIG. 1 is a high-level block diagram showing one example of a network architecture comprising various types of storage systems.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, various aspects of the invention may be embodied as an apparatus, system, method, or computer program product. Furthermore, various aspects of the invention may take the form of a hardware embodiment, a software embodiment (including firmware, resident software, micro-code, etc.) configured to operate hardware, or an embodiment combining software and hardware that may all generally be referred to herein as a "module" or "system." Furthermore, various aspects of the invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for carrying out operations of the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where an apparatus and method in accordance with the invention may be implemented. The network architecture 100 is presented only by way of example and not limitation. Indeed, the apparatus and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives or solid-state drives, tape libraries, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
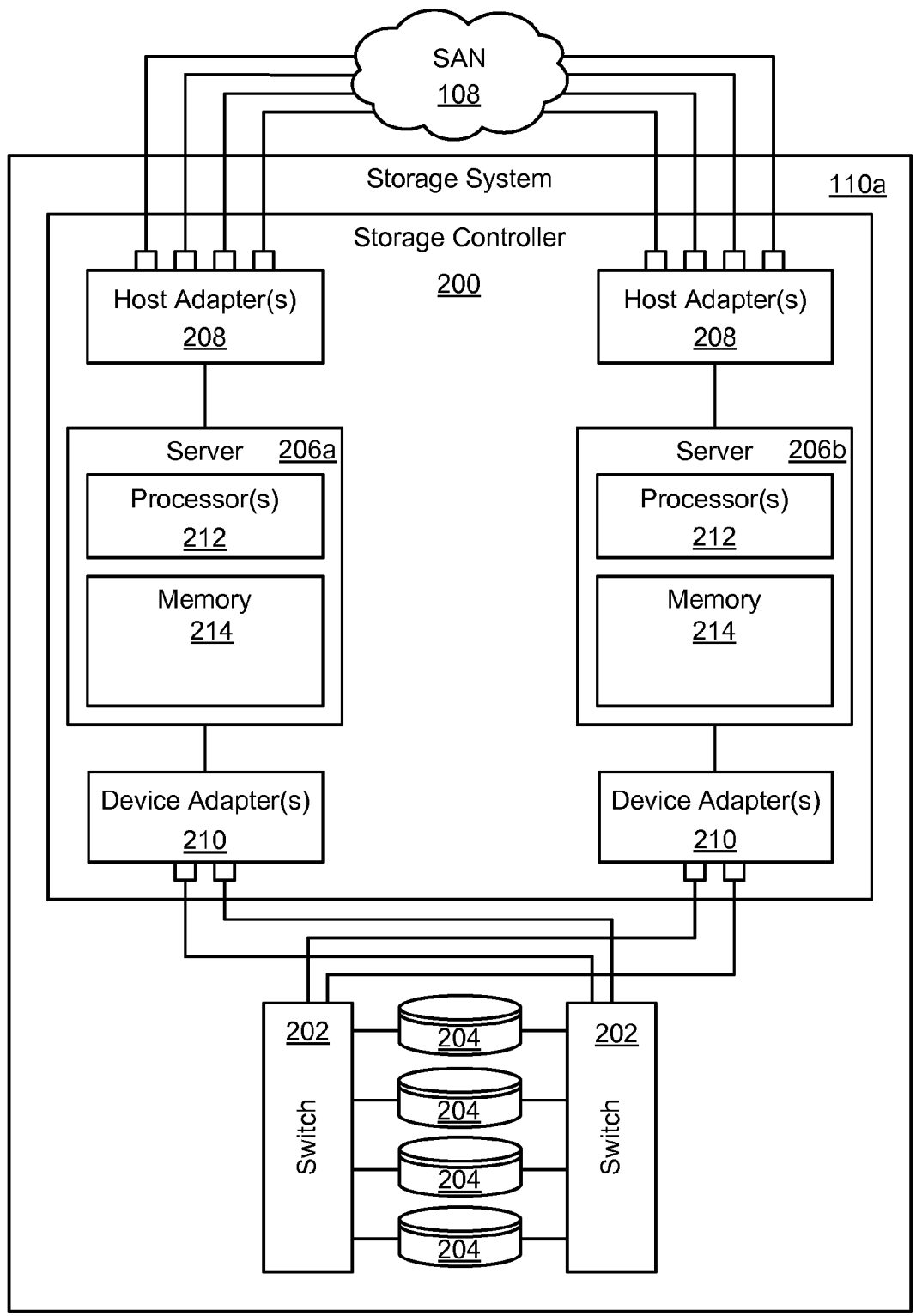
FIG. 2 is a high-level block diagram showing one example of a storage system containing one or more SSDs.

Referring to FIG. 2, one embodiment of a storage system 110a containing an array of hard-disk drives 204 and/or solid-state drives 204 is illustrated. The internal components of the storage system 110a are shown since various aspect of the invention may, in certain embodiments, be implemented within such a storage system 110a, although the apparatus and methods may also be applicable to other storage systems 110. As shown, the storage system 110a includes a storage controller 200, one or more switches 202, and one or more storage devices 204, such as hard disk drives 204 or solid-state drives 204 (such as flash-memory-based drives 204). The storage controller 200 may enable one or more hosts 106 (e.g., open system and/or mainframe servers 106) to access data in the one or more storage devices 204.

In selected embodiments, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage devices 204. This process may be referred to as a "failover."

One example of a storage system 110a having an architecture similar to that illustrated in FIG. 2 is the IBM DS8000™ enterprise storage system. The DS8000™ is a high-performance, high-capacity storage controller providing disk storage that is designed to support continuous operations. Nevertheless, the methods disclosed herein are not limited to the IBM DS8000™ enterprise storage system 110a, but may be implemented in any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented only by way of example and is not intended to be limiting.

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage devices 204. These software modules may manage read and write requests to logical volumes in the storage devices 204.

Figure 3:
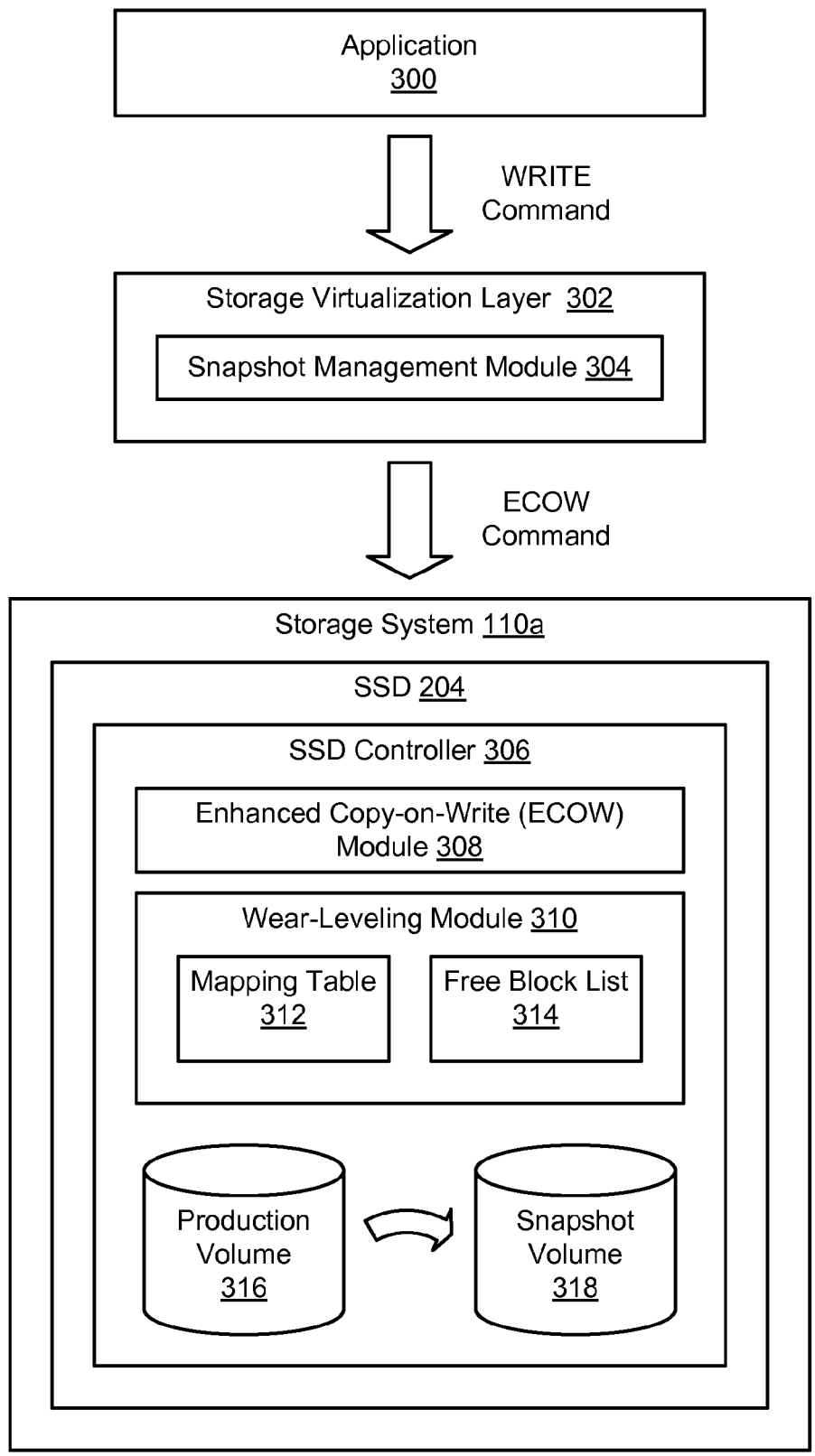
FIG. 3 is a high-level block diagram showing one example of a system comprising an SSD configured to perform an enhanced copy-on-write operation.

Referring to FIG. 3, as previously mentioned, one commonly-used approach for implementing a snapshot of a production volume is to use a "copy-on-write" technique. Unfortunately, one disadvantage of the copy-on-write technique is that it requires multiple read/write operations (one read and two writes) for each application write I/O. This can be particularly disadvantageous with newer high-speed storage media such as solid state drives (SSDs) which are limited in terms of the number of I/Os they can handle during their lifetimes. Thus, apparatus and methods are needed to more efficiency perform copy-on-write operations on SSDs used to store snapshots. For the purpose of this disclosure, the phrase "solid state drive," or SSD, is used broadly to refer to any type of data storage device that uses solid-state memory to store persistent data.

FIG. 3 is a high-level block diagram showing a technique for enhancing the copy-on-write operation on an SSD 204. Currently, many SSD controllers 306 utilize a wear-leveling algorithm (hereinafter referred to as a wear-leveling module 310) to ensure that memory cells are utilized uniformly. The wear-leveling module 310 uniformly distributes writes across the solid-state storage media to maximize the effective life of the media. This wear-leveling module 310 may be used with a new enhanced copy-on-write (ECOW) module 308 within the SSD controller 306 to improve the copy-on-write operation. Use of the wear-leveling algorithm on the SSD 204 allows the ECOW module 308 to implement the enhanced copy-on-write operation on the SSD 204 without introducing substantial overhead on the SSD 204. The operation of the ECOW module 308 will be described in more detail hereafter.

In general, the ECOW module 308 is configured to receive a new ECOW command and, using the arguments in the ECOW command, implement the copy-on-write operation in the SSD 204 in a very efficient manner. The ECOW command may be treated as an enhancement to the WRITE command normally used to implement the copy-on-write operation inside the SSD controller 306. Using the ECOW command, the ECOW module 308 may reduce the number of I/Os associated with an application write operation from three to one. The ECOW module 308 may accomplish this by leveraging the functionality of the wear-leveling module 310. The ECOW command may be used by higher level snapshot software (e.g., block virtualization software 302 such as IBM's SAN Volume Controller (SVC) or Logical Volume Manager (LVM)) that is used to implement snapshots.

FIG. 3 provides a high-level view of how the ECOW command may be used to improve the copy-on-write operation. As shown, an application 300 (residing in a host system 106) may generate a WRITE command to write data to a production volume 316. A storage virtualization layer 302, between the application 300 and a storage system 110a containing the production volume 316, may intercept the WRITE command. In the illustrated embodiment, the storage virtualization layer 302 includes a snapshot management module 304 to manage snapshots on the storage system 110a.

Assuming the production volume 316 has at least one active snapshot 318 associated therewith, the storage virtualization layer 302 initially determines whether a copy-on-write operation in needed in response to the write request. This may be accomplished, for example, by determining whether the write is the first write to a logical block of the production volume 316 after the snapshot 318 was taken. If a copy-on-write operation is needed, the storage virtualization layer 302 determines the location on the snapshot volume 318 where the original data should be copied. The storage virtualization layer 302 then sends an ECOW command to the SSD 204 having the following arguments: (1) new data to be written to the SSD; (2) a first logical address specifying a logical location where the new data should be written to the SSD; and (3) a second logical address specifying a logical location where the original data should be available on the SSD. The manner in which these arguments are used will be described in more detail in association with FIGS. 6 and 7. The storage virtualization layer 302 then sends a write acknowledgement to the application 300.

The ECOW module 308 on the SSD 204 receives the ECOW command and associated arguments and, using the functionality of the wear-leveling module 310, executes the ECOW command on the SSD 204. As shown, the wear-leveling module 310 includes both a mapping table 312 and a free block list 314. The mapping table 312 may be used to map logical addresses (e.g., logical block addresses) to physical blocks on the SSD 204. A free block list 314 may store a list of blocks that are free (i.e., do not contain needed data) on the SSD 204.

When the wear-leveling module 310 receives a request to write data to a block at a given logical block address (the logical block address is the offset on the SSD 204 where the data is to be written), the wear-leveling module 310 selects a new physical block from the free block list 314 and writes the data to the new physical block. The wear-leveling module 310 then modifies the mapping table 312 to map the new physical block to the logical block address received with the write request. The physical block previously associated with the logical block address is added to the free block list 314. In this way, writes may be distributed across the media even where writes are directed to the same logical block address. As will be shown in association with FIGS. 6 and 7, this functionality may be used advantageously to reduce the number of I/Os needed to move data from a production volume 316 to a snapshot volume 318 when a copy-on-write operation is performed.

The modules illustrated in FIG. 3 may be implemented in hardware, software or firmware executable on hardware, or a combination thereof. The modules are presented only by way of example and are not intended to be limiting. Indeed, alternative embodiments may include additional or fewer modules. The functionality of the modules may also be organized differently. For example, the functionality of some modules may be broken into multiple modules or, conversely, the functionality of several modules may be combined into a single module or fewer modules.

Figure 4:
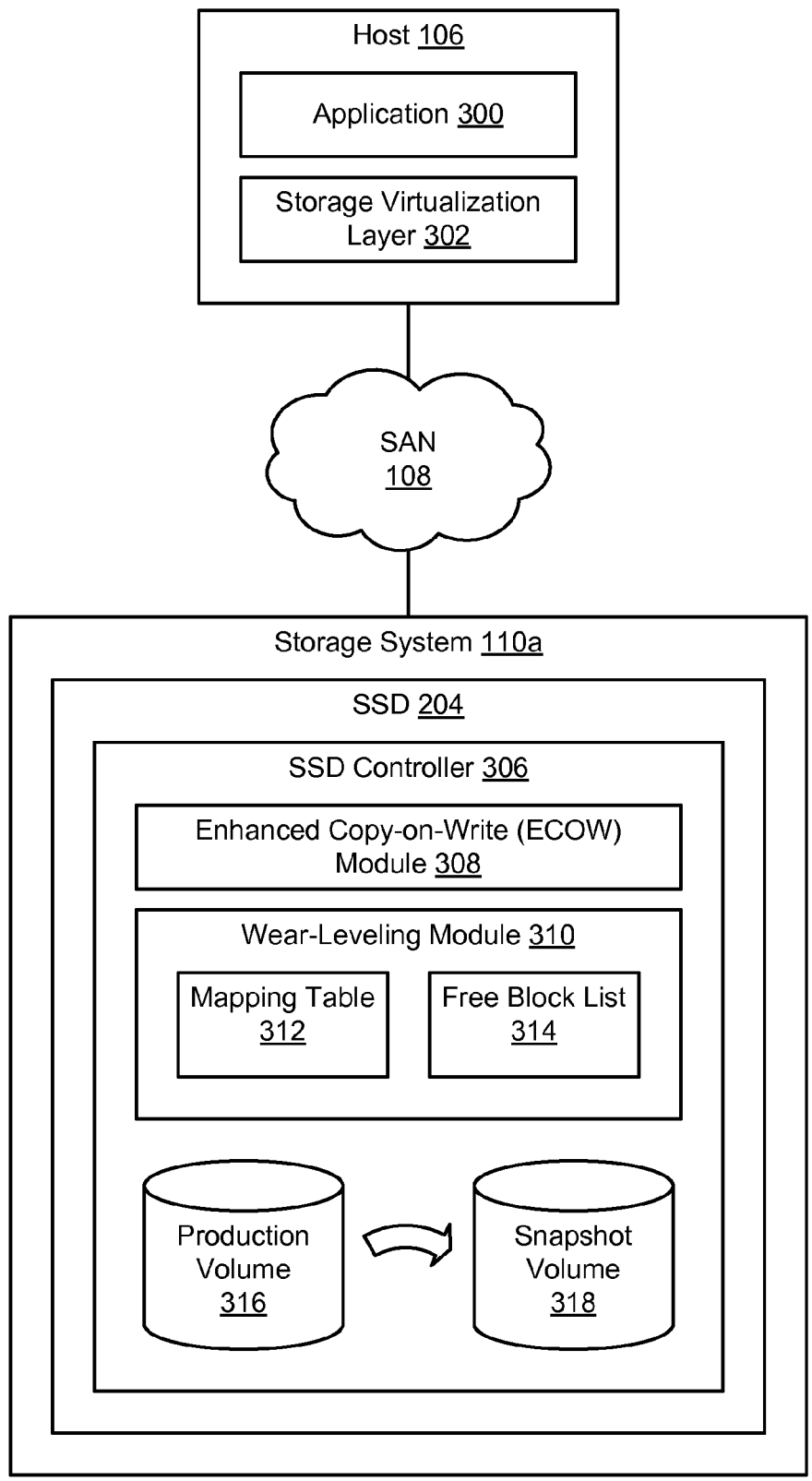
FIG. 4 is a high-level block diagram showing one embodiment of a system having a storage virtualization layer implemented in a host device.
Figure 5:
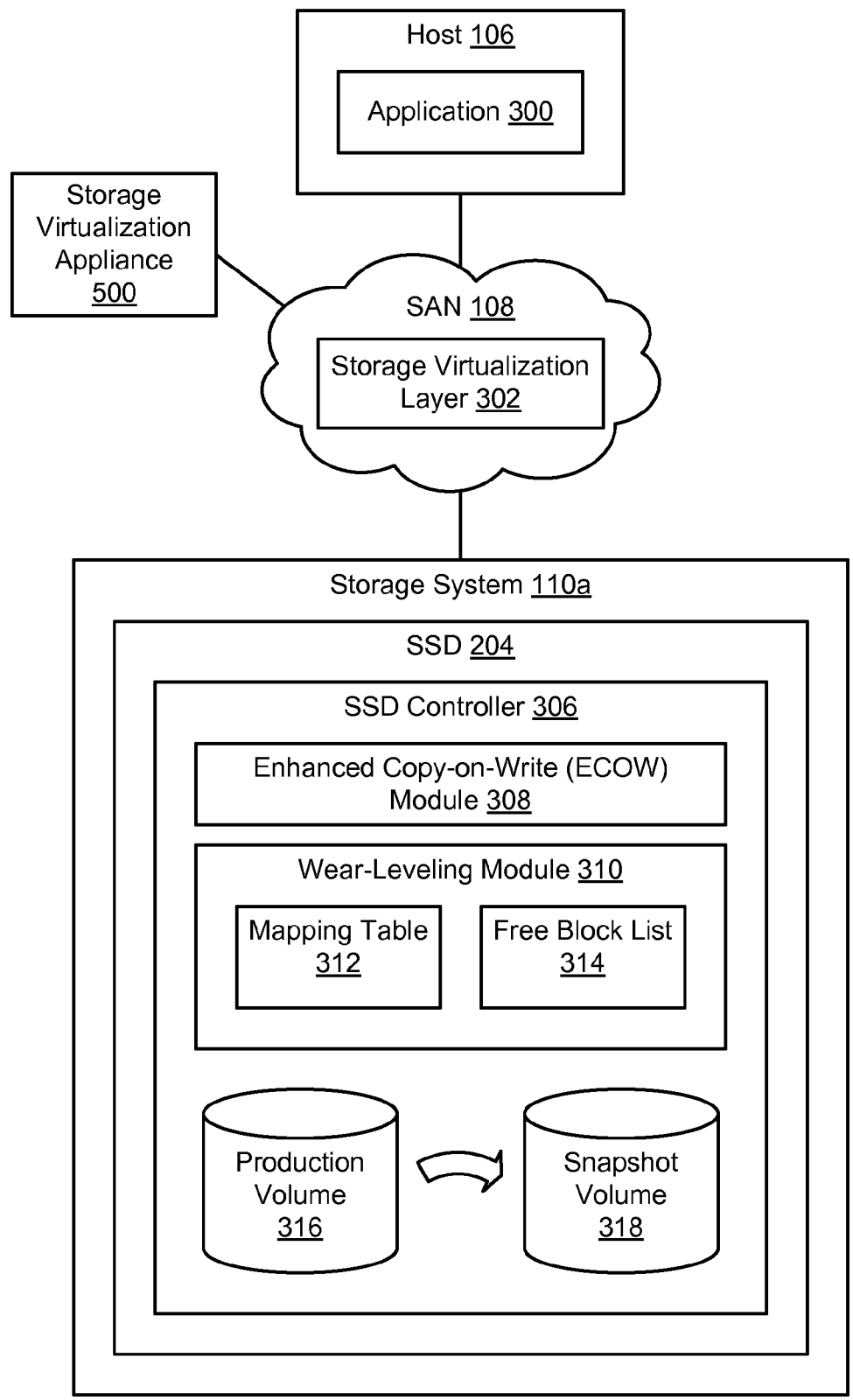
FIG. 5 is a high-level block diagram showing one embodiment of a system having a storage virtualization layer implemented in a storage-area-network (SAN)

Referring to FIGS. 4 and 5, as previously mentioned, the ECOW command may be used by higher level storage virtualization layers 302 that implement snapshots 318 on the underlying storage media. Such storage virtualization layers 302 may reside at various locations within the network architecture. For example, storage virtualization layers 302 may be located at one or more of the host system 106, storage area network 108, and storage system 110 levels. FIG. 4 shows a storage virtualization layer 302 located on a host system 106. A storage virtualization layer 302 based on Logical Volume Manager (LVM) fits into this category. FIG. 5 shows a storage virtualization layer 302 located within a SAN 108. Such a storage virtualization layer 302, for example, may be implemented by a SAN appliance 500 that intercepts traffic between the host system 106 and the storage system 110a. IBM's SAN Volume Controller (SVC) is a storage virtualization product that fits into this category. In other embodiments, the storage virtualization layer 302 is implemented in the storage system 110a that contains the production volume 316 and snapshot volume 318.

Figure 6:
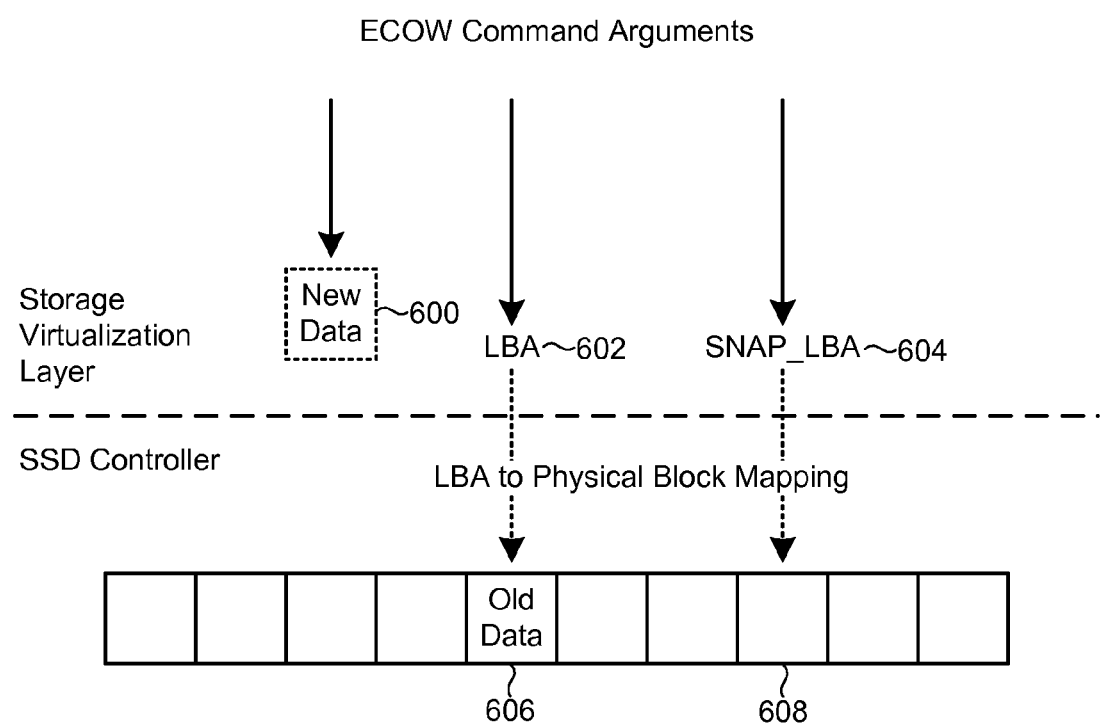
FIG. 6 is a diagram showing arguments provided to an SSD controller as part of an enhanced copy-on-write command.

Referring to FIG. 6, a diagram showing arguments provided to an SSD controller 306 as part of an enhanced copy-on-write command is illustrated. Upon receiving a write command from an application 300, the storage virtualization layer 302 sends an ECOW command to the SSD controller 306 with the illustrated arguments: new data 600 to be written to the SSD 204; a first logical address 602 (e.g., a logical block address 602) specifying a logical location where the new data 600 should be written to the SSD 204; and (3) a second logical address 604 (e.g., a logical block address 604) specifying a logical location where the original data should be available on the SSD 204.

Before the ECOW command is executed, the first logical block address 602 maps to a first physical block 606, storing the original data, and the second logical block address 604 maps to a second physical block 608 in the snapshot volume 318. These mappings are illustrated in FIG. 6. The mapping table 312 associated with the wear-leveling module 310 stores these mappings.

Figure 7:
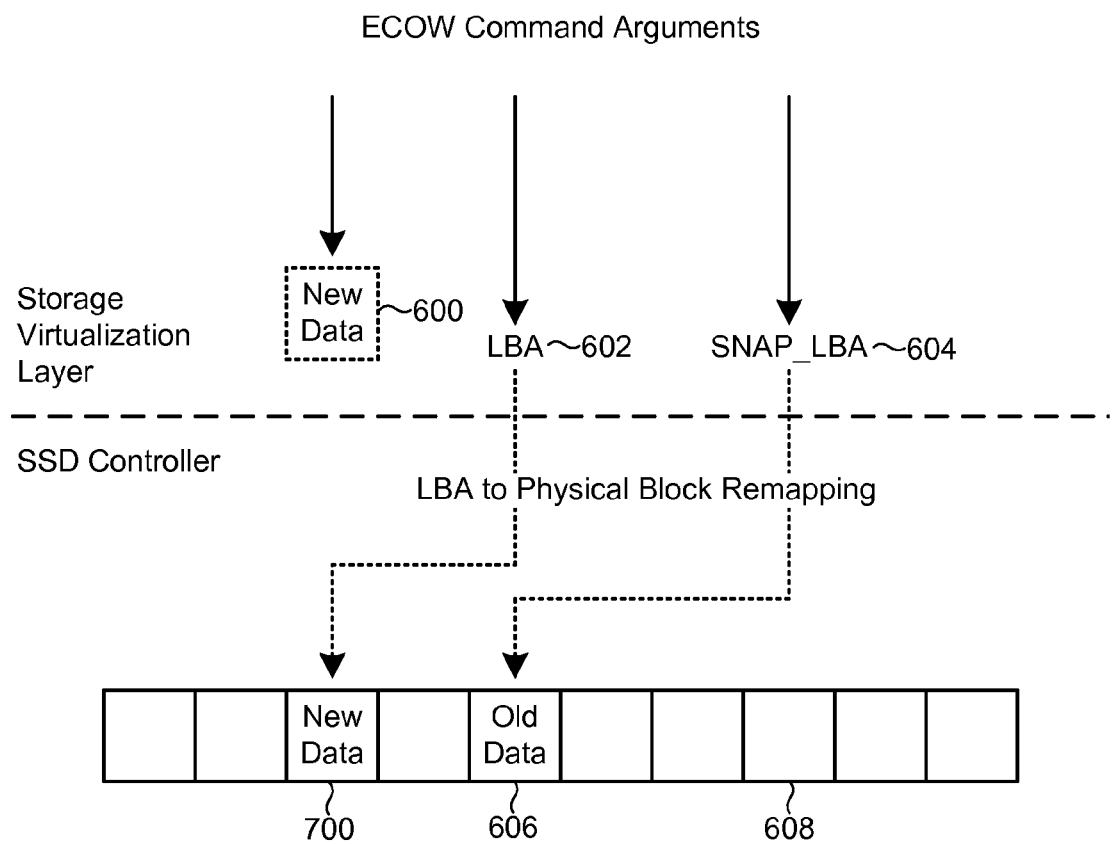
FIG. 7 is a diagram showing how an SSD controller in accordance with the invention performs an enhanced copy-on-write operation in response to receiving an enhanced copy-on-write command.

Referring to FIG. 7, upon executing the ECOW command, the wear-leveling module 310 selects a physical block 700 from the free block list 314 and writes the new data 600 to the new physical block 700. The wear-leveling module 310 modifies the mapping table 312 to map the new physical block 700 to the first logical block address 602 received with the ECOW command. The old physical block 606, instead of adding it to the free block list 314, is mapped to the second logical block address 604. The physical block 608 previously associated with the second logical block address 604 may be added to the free block list 314. These operations are the equivalent of copying the original data from the production volume 316 to the snapshot volume 318, except that no data is physically moved. Only the LBA to physical block mappings in the mapping table 312 are modified. The entire operation may be atomic and handled transparently inside the SSD controller 306. After the enhanced copy-on-write operation is complete, the new data will be available at the first logical address 602 and the original data will be available at the second logical address 604.

Figure 8A:
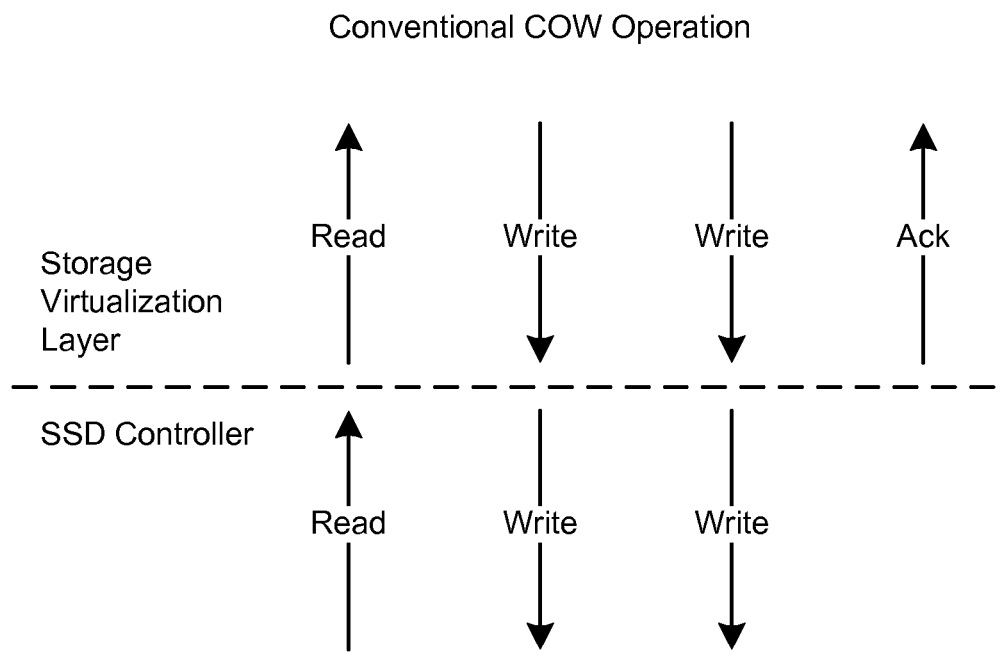
FIG. 8A is a diagram showing I/O that occurs upon performing a conventional copy-on-write operation, where the production volume and the snapshot volume are located on the same SSD.

Referring to FIGS. 8A and 8A, as previously mentioned, the ECOW module 308 and associated ECOW command may reduce the number of I/Os associated with a copy-on-write operation from three to one. FIG. 8A shows the I/O that is required for a conventional copy-on-write operation. As shown in FIG. 8A, in a conventional copy-on-write operation, the storage virtualization layer 302 performs three I/O prior to returning a write acknowledgment to the application 300.

Prior to performing an initial write to a production volume 316 after a snapshot is taken, the storage virtualization layer 302 must read the original data in the production volume 316 and write the original data to the snapshot volume 318. Only then may the storage virtualization layer 302 write the new data to the production volume 316. Once all three I/Os are complete, the storage virtualization layer 302 may return an acknowledgment to the application 300 that originated the write request. Not only does this operation consume significant I/O and memory resources of the storage virtualization layer 302, it negatively impacts application write latency, since three I/Os are needed to complete the write. It also places substantial wear and tear on the SSD 204, where two writes to the sold-state media are needed to complete the copy-on-write operation.

Figure 8B:
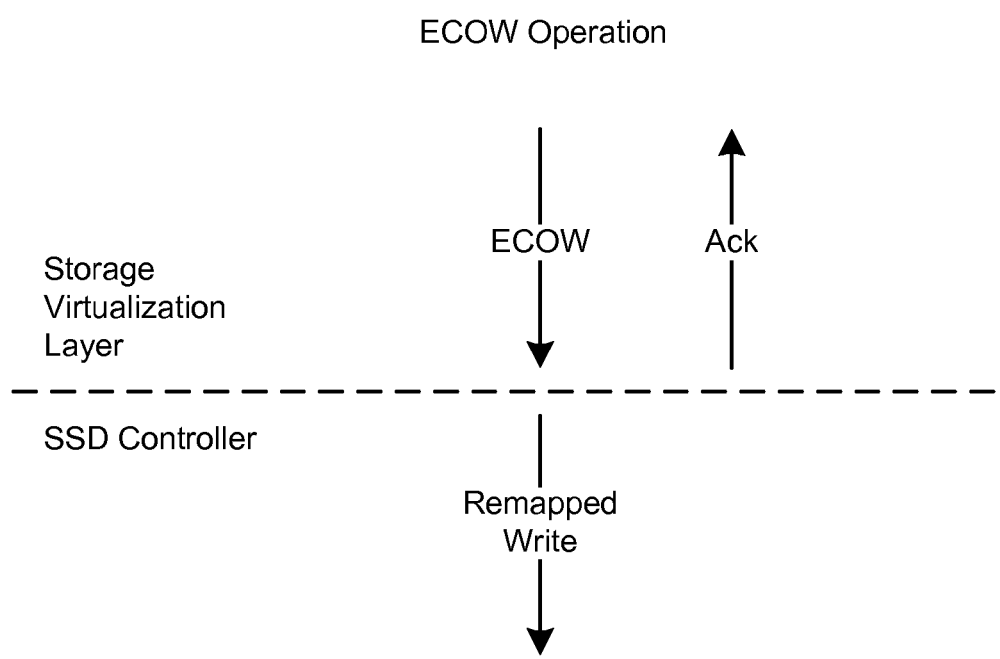
FIG. 8B is a diagram showing an example of I/O that occurs upon performing an enhanced copy-on-write operation in accordance with the invention, where the production volume and the snapshot volume are located on the same SSD.

FIG. 8B shows the I/O that is required for an enhanced copy-on-write operation in accordance with the invention. As shown in FIG. 8B, using the enhanced copy-on-write operation, the storage virtualization layer 302 only needs to perform a single I/O before returning a write acknowledgment to the application 300. That is, the storage virtualization layer 302 sends a single ECOW command to the SSD 204. The SSD 204 executes this command internally by writing the new data to a new physical block and remapping the original data to a different logical block address. Not only does this extend the effective life of the SSD 204 (by halving the number of writes to the SSD 204), it also reduces write latency since the storage virtualization layer 302 only performs a single I/O before returning an acknowledgment to the application 300. Because the enhanced copy-on-write operation is offloaded to the SSD controller 306, the I/O and memory resource consumption in the storage virtualization layer 302 is substantially reduced.

Figure 9A:
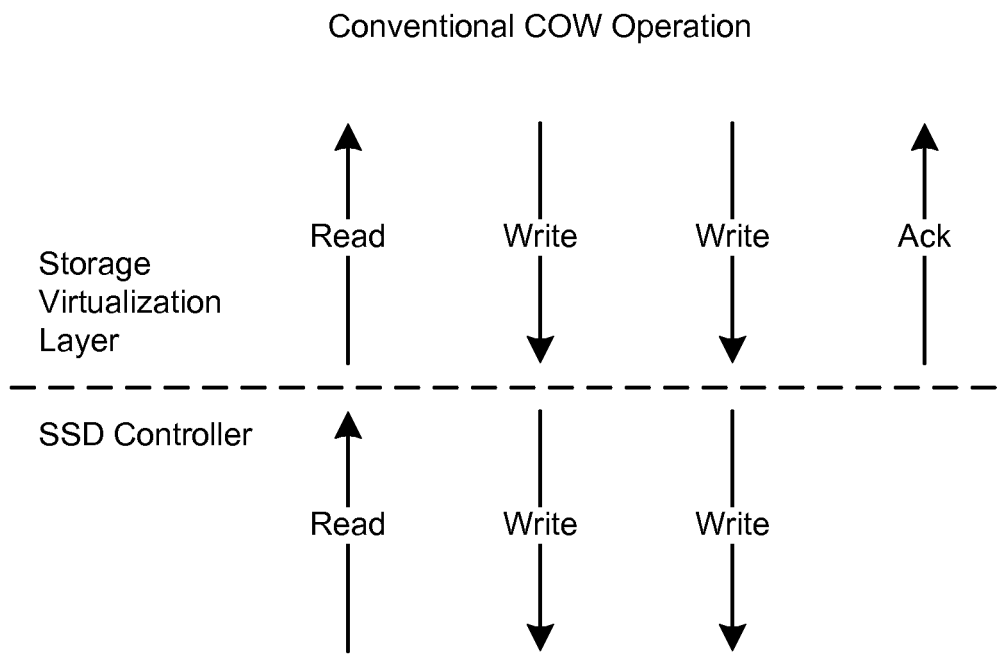
FIG. 9A is a diagram showing I/O that occurs upon performing a conventional copy-on-write operation, where the production volume and the snapshot volume are located on different SSDs.
Figure 9B:
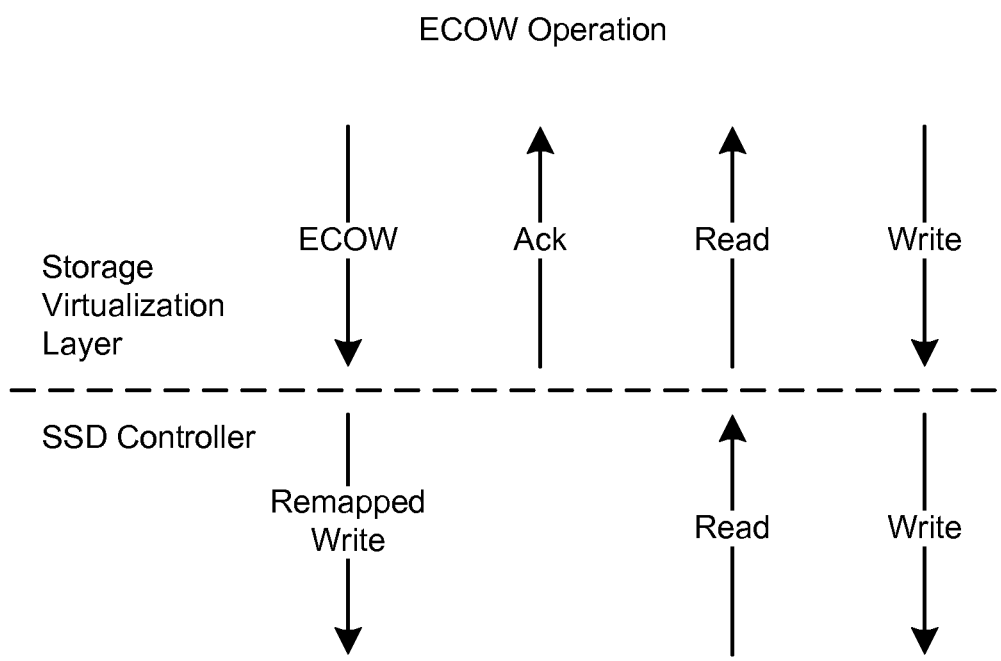
FIG. 9B is a diagram showing an example of I/O that occurs upon performing an enhanced copy-on-write operation, where the production volume and the snapshot volume are located on different SSDs.

Referring to FIGS. 9A and 9B, the techniques discussed above in association with FIGS. 3 through 8 assume that the production volume 316 and snapshot volume 318 are located on the same SSD 204. If the production volume 316 and snapshot volume 318 are not on the same SSD 204, an alternative approach may be used. The alternative approach includes reserving a small amount of scratch space on each SSD 204 to address situations in which the production logical block address and the snapshot logical block address are located on different SSDs 204. This scratch space may be used as a temporary sandbox for processing copy-on-write operations.

Upon receiving a write request from an application 300, the storage virtualization layer 302 determines whether a copy-on-write operation is needed (e.g., by determining whether the write request is the first write to the logical block of the production volume 316 after the snapshot was created). If a copy-on-write operation is needed, the storage virtualization layer 302 identifies a free block in the scratch space. This scratch space is on the same SSD 204 as the production volume 316 associated with the write request. The storage virtualization layer 302 then sends an ECOW command to the SSD 204 storing the production volume 316 with the following arguments: (1) the new data to be written to the SSD 204; (2) a first logical block address specifying where the new data should be written to the SSD 204; and (3) a second logical block address in the scratch space specifying where the original data should be available on the SSD 204. The storage virtualization layer 302 then sends a write acknowledgment to the application 300. Once this acknowledgement is sent, the storage virtualization layer 302 may read the original data from the scratch space and write it to the snapshot logical block address located on the other SSD 204 without involving the host 106. This saves storage network bandwidth and reduces latency for the application WRITE command.

Using this approach, the application write is acknowledged immediately after the ECOW command is executed. The reading of the original data from the scratch space and writing it to the snapshot are performed in the background. Although this alternative approach does not reduce the number I/Os needed to complete the copy-on-write operation (one read and two writes are still needed), it does reduce application write latency compared to conventional copy-on-write operations. That is, like the approach discussed in associated with FIGS. 8A and 8B, the application write is acknowledged after only a single I/O on the SSD 204. FIG. 9A shows I/O that is performed for a conventional copy-on-write operation where the production volume 316 and snapshot volume 318 are located on different SSDs 204. FIG. 9B shows I/O that is performed for an enhanced copy-on-write operation where the production volume 316 and snapshot volume 318 are located on different SSDs 204.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for increasing the efficiency of a "copy-on-write" operation, the method comprising:
    receiving an enhanced copy-on-write (ECOW) command comprising the following arguments:
        new data to be written to a solid state drive (SSD);
        a first logical address specifying a logical location where the new data should be written to the SSD, the first logical address mapping to a first physical location, storing original data, on the SSD; and
        a second logical address specifying a logical location where the original data should be available on the SSD, the second logical address mapping to a second physical location on the SSD;
    performing the following in response to receiving the ECOW command:
        determining a new physical location on the SSD;
        writing the new data to the new physical location;
        mapping the first logical address to the new physical location; and
        mapping the second logical address to the first physical location.

2. The method of claim 1, further comprising modifying a mapping table such that the second logical address maps to the first physical location.

3. The method of claim 1, wherein the second logical address identifies a scratch space on the SSD where the original data should be available on the SSD.

4. The method of claim 3, wherein the original data is copied from the scratch space on the SSD to a different SSD.

5. The method of claim 1, further comprising copying the original data from the first physical location to a third physical location on a different SSD.

6. The method of claim 1, wherein receiving the new data, first logical address, and second logical address comprises receiving the new data, first logical address, and second logical address from a storage virtualization layer.

7. The method of claim 1, wherein the first and second logical addresses are logical block addresses.

8. The method of claim 1, wherein the SSD utilizes a wear-leveling algorithm that ensures that memory cells in the SSD are utilized substantially uniformly.

9. A method for increasing the efficiency of a "copy-on-write" operation, the method comprising:
 receiving, by a storage virtualization layer, a write command;
 determining, by the storage virtualization layer, whether a copy-on-write operation is required in response to the write command;
 sending, by the storage virtualization layer in the event the copy-on-write operation is required, an enhanced copy-on-write (ECOW) command to a solid state drive (SSD) to perform an enhanced copy-on-write operation thereon, the ECOW command having as arguments: (1) new data to be written to the SSD; (2) a first logical address specifying a logical location where the new data should be written to the SSD; and (3) a second logical address specifying a logical location where the original data should be available on the SSD; and
 performing, by the SSD, the following in response to receiving the ECOW command: (1) determining a new physical location on the SSD; (2) writing the new data to the new physical location; (3) mapping the first logical address to the new physical location; and (4) mapping the second logical address to the first physical location.

10. The method of claim 9, wherein the first and second logical addresses are logical block addresses.

11. The method of claim 9, wherein the enhanced copy-on-write operation causes only a single write to be performed on the SSD.

12. The method of claim 9, further comprising determining, by the storage virtualization layer, whether the original data needs to be copied to a second SSD.

13. The method of claim 12, further comprising returning, by the storage virtualization layer, a write acknowledgement prior to copying the original data to the second SSD.

* * * * *